June 23, 1970 W. F. W. DIETZ 3,517,253

VOLTAGE REGULATOR

Filed May 22, 1968

INVENTOR
WOLFGANG F. W. DIETZ
BY Kenneth R. Schaefer
Attorney 3,517,253

VOLTAGE REGULATOR

Wolfgang F. W. Dietz, Indianapolis, Ind., assignor to RCA Corporation, a corporation of Delaware Filed May 22, 1968, Ser. No. 731,163
Int. Cl. H01j 29/76
U.S. Cl. 315—27 12 Claims

ABSTRACT OF THE DISCLOSURE

A horizontal deflection and high voltage generating circuit for a television receiver wherein image width is maintained substantially constant despite variations in kinescope beam current and main B+ supply voltage. Circuit reactive components are proportioned to compensate for the effect of beam current variation on deflection current and high voltage while system input power is regulated to compensate for main B+ supply voltage variations.

This invention relates to voltage supplies and more particularly to a regulated high voltage supply suitable for supplying the ultor or final anode voltage requirements of a cathode ray tube.

One application of such a ultor voltage supply which is of particular interest is a shadow-mask type of color kinescope. The various aspects of the present invention therefore will be described in connection with such a display devices as it is used in a color television receiver.

In the design of color television receivers, it is a customary practice to develop the ultor supply voltage by rectificaation of flyback pulses produced in an associated horizontal deflection output transformer. Additionally, color television receivers commonly employ some form of regulator (e.g. a shunt regulator or ballast tube) coupled to the ulator voltage supply for maintaining ultor voltage (and, in the case of a shunt regulator, the load on the horizontal output transformer) relatively constant as kinescope beam current (ultor load) varies. In my copending U.S. patent application Ser. No. 721,383, filed Apr. 15, 1968, entitled "Electron Beam Deflection and High Voltage Generation Circuit," an arrangement is described wherein reactive components (inductance and capacitance) are selected so as to maintain image width substantially constant as beam current varies. That is, the components may be selected so that, as ultor voltage varies, a compensating variation is produced in the deflection current supplies to an associated deflection yoke so as to maintain image width substantially constant.

Ultor supply voltage, in addition to being affected by kinescope beam current variaations, also may vary as line voltage and/or the main supply voltage (B+) of the television receiver varies. Consequent variations also may be produced in the beam deflection current so as to produce variations in image size (e.g. width) as line or main supply voltage varies.

It is an object of the present invention to maintain ultor supply voltage substantially constant as the main supply voltage varies in a television receiver.

It is a further object of the present invention to maintain horizontal deflection current and image width substantially constant as the main supply votlage varies in a television receiver.

It is a further object of the present invention to maintain image width substantially constant despite variations in the main supply voltage and/or kinescope beam current.

In a preferred embodiment of the present invention, a first bi-directionally conductive trace switching means couples a voltage supply across a deflection winding during the trace portion of each deflection cycle. A bi-directionally conductive commutating switching means is coupled to the trace switching means by reactive circuit components comprising inductance and capacitance. A current supply comprising a variable inductance is coupled to the capacitance to supply charging current thereto during trace. High voltage produced in an associated circuit and deflection current supplied to the deflection winding are maintained in predetermined relationship by selection of the reactive circuit components and by changing the variable inductance so as to maintain deflection current substantially constant despite changes in kinescope beam current and main supply voltage.

The novel features that are considered characteristic of this invention are set forth with particularity in the appended claims. The invention itself, however, both as to its organization and method of operation as well as additional objects thereof will best be understood from the following description when read in connection with the accompanying drawing, in which:

Figure 1:
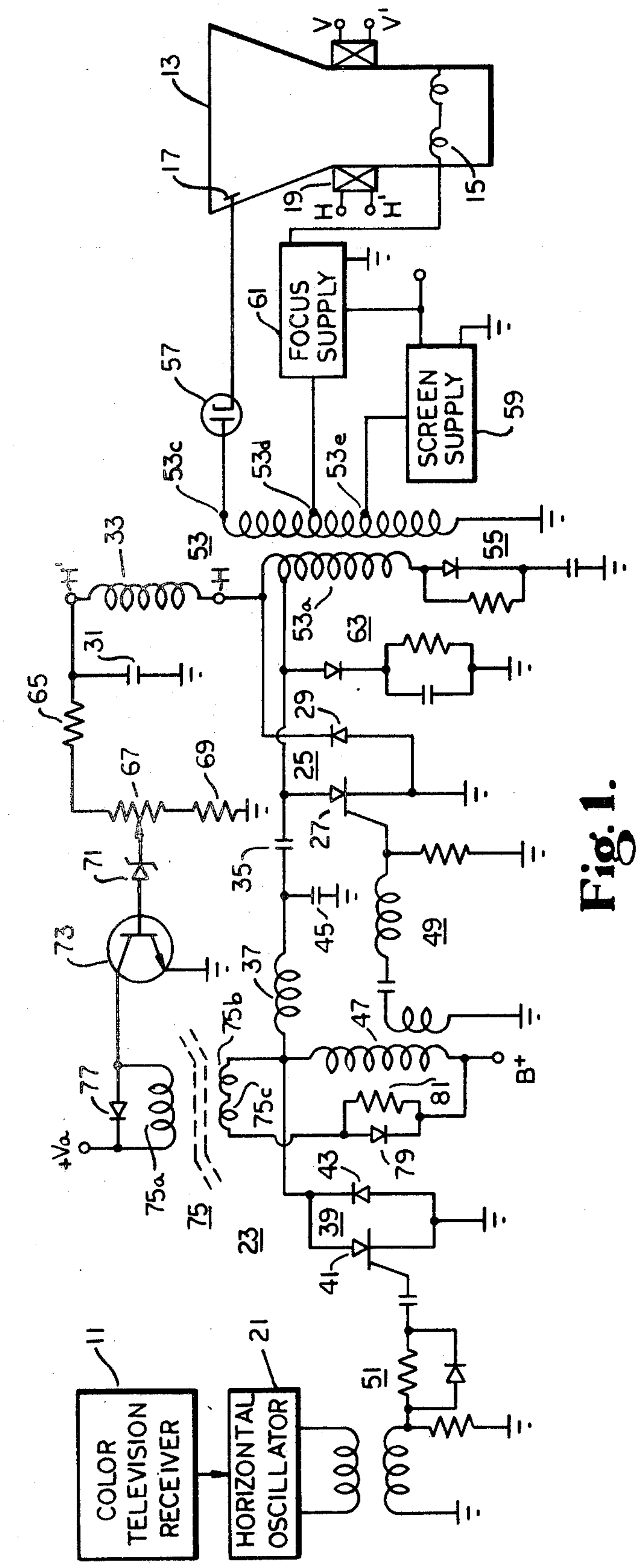
FIG. 1 illustrates in block and schematic form a color television receiver including a horizontal deflection and regulated high voltage circuit constructed in accordance with the present invention.

In FIG. 1, a color television receiver which may be of a generally conventional type of illustrated in block form, with, however, details of the horizontal output circuitry and associated high voltage supply shown schematically. In the typical receiver 11, a carrier wave modulated by composite color television signals is received by signal receiving apparatus which includes the usual R.F. tuner, frequency converting apparatus, I.F. amplifier and video detector. Video signals are recovered in the receiving apparatus from the modulated carrier and are amplified in a video amplifier. The amplified video signals are supplied to a keyed AGC circuit which controls amplifier gain in the signal receiving apparatus in accordance with conventional automatic gain control principles. The video signals also are applied to a luminance channel, to a chrominance channel and to a synchronizing signal separator. The chrominance channel processes the color information to a form suitable for application to a color image reproducer. A three-gun shadow mask color kinescope 13 serves as the color image reproducer of the illustrated receiver. The electrode structure of the color kinescope 13 includes respective red, green and blue cathodes; respective red, green and blue control grids; respective red, green and blue screen electrodes; (also known as first or accelerating anodes); a focusing electrode structure 15 and an ultor electrode (or final anode) 17. The target assembly of the color kinescope 13 comprises a phosphor screen composed of a regular array of red, green- and blue-emitting phosphor dots and an associated perforated mask.

A deflection yoke 19 is associated with the color kinescope 13 and responds to respective vertical and horizontal deflection waves to cause the individual beams produced by color kinescope 13 to trace a raster on the phosphor screen. A convergence yoke (not shown) which responds to suitable dynamic convergence waveforms to cause the color kinescope beams to properly converge in the target region throughout the scanning of the raster is also customarily associated with kinescope 13.

The color signal outputs of the chrominance channel are applied individually to the respective control grids of the kinescope 13. The respective cathodes are driven by the output of the luminance channel which serves to amplify the luminance component of the composite signal and includes suitable delay apparatus to equalize the delay of the luminance component with the delay encountered by the chrominance information in the chrominance channel.

The output of the sync separator is supplied to the vertical deflection circuits and to a horizontal deflection oscillator 21. The vertical deflection circuits generate a vertical deflection wave for application to the terminals V, V' of the deflection yoke 19, under the control of vertical synchronizing pulses derived from the sync separator apparatus. The horizontal oscillator 21, which may be a conventional blocking oscillator, develops a periodic switching voltage under the control of horizontal synchronizing pulses derived from the sync separator apparatus. The oscillator 21 is associated with suitable deflection AFC apparatus (not shown) for assuring the desired synchronization.

The periodic switching voltage developed by oscillator 21 is applied to a horizontal deflection circuit indicated generally by the reference numeral 23.

Deflection circuit 23 is of the type shown and described in my U.S. patent application Ser. No. 721,383, filed Apr. 15, 1968, entitled "Electron Beam Deflection and High Voltage Generation Circuit," and assigned to the same assignee as the present invention. Briefly stated, deflection circuit 23 comprises a bilaterally conductive trace switching means 25 comprising a silicon controlled rectifier (SCR) 27 and a diode 29 for coupling a relatively large energy storage capacitor 31 across a horizontal deflection winding 33 during the trace portion of each deflection cycle. A first capacitor 35 and a commutating inductor 37 are coupled between trace switching means 25 and a bilaterally conductive commutating switching means 39, which comprises a silicon controlled rectifier 41 and a diode 43. A second capacitor 45 is coupled from the junction of capacitor 35 and commutating inductor 37 to ground. A main voltage supply (B+) is coupled to a relatively large supply inductor 47, which in turn, is coupled to the junction of commutating inductor 37 and commutating switching means 39.

First triggering means 49 is coupled from inductor 47 to SCR 27 for initiating conduction in SCR 27 during the trace portion of each deflection cycle. Second triggering means 51 is coupled from horizontal oscillator 21 to SCR 41 for initiating conduction therein near the end of the trace portion of each deflection cycle.

The primary winding 53*a* or a horizontal deflection output transformer 53 is coupled to deflection winding 33 and is returned to ground by means of a protection circuit 55.

Deflection winding 33 and trace diode 29 are coupled to the terminal H on transformer 53 which, for example, is at a voltage level slightly higher than the end terminal on primary winding 53*a* so as to compensate for the difference in voltage required across diode 29 and SCR 27 during their respective conduction periods.

A secondary step-up winding 53*b* having a high voltage tap (terminal) 53*c*, a focus voltage tap 53*d* and a screen voltage tap 53*e* is returned to ground at its lower end. A high voltage rectifier 57 is coupled between high voltage tap 53*c* and the ultor electrode 17 of kinescope 13 for supplying a high beam accelerating voltage (e.g. of the order of 25,000 volts) to kinescope 13.

A screen voltage supply 59 is coupled between screen voltage tap 53*e* and ground while a focus voltage supply 61 is coupled between focus voltage tap 53*d* and focus electrode 15. Screen supply 59 and focus supply 61 may be of the type described in my co-pending U.S. patent application Ser. No. 730,996, entitled "Voltage Supply," and filed concurrently herewith.

A further protective circuit 63 arranged to limit positive polarity voltage excursions is coupled across SCR 27.

A sensing means comprising the series combination of a resistor 65, a variable high voltage adjustment resistor 67 and a resistor 69 is coupled across energy storage capacitor 31. A reference voltage Zener diode 71 is coupled between the variable contact of resistor 67 and the input of a control means comprising a transistor amplifier 73.

Transistor 73 is an N-P-N type and comprises a base electrode coupled to Zener diode 71, an emitter electrode coupled to ground and a collector electrode coupled to a source of operating voltage $+V_a$ by a control winding 75*a* of a saturable reactor 75. A recovery diode 77 is coupled across control winding 75*a*.

Series connected secondary (load) windings 75*b* and 75*c* operatively associated with control winding 75*a* are coupled across supply inductor 47 by means of the parallel combination of a diode 79 and a resistor 81.

The operation of the deflection circuit 23 is explained in detail in my above-mentioned co-pending U.S. patent application Ser. No. 721,383, but will be restated in part below as it applies to the present invention.

Figure 2:
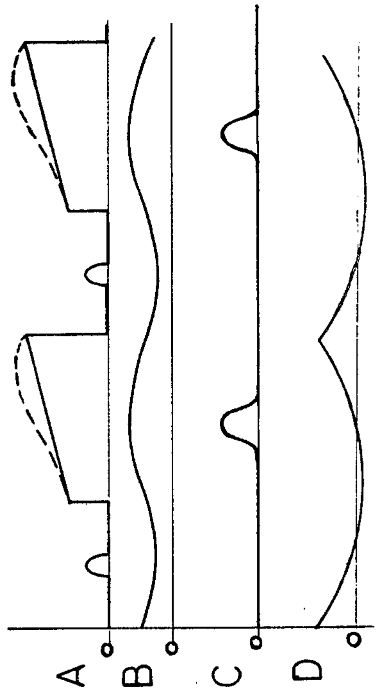
FIG. 2 illustrates voltage and current waveforms, (not drawn to scale) occurring in the circuit illustrated in FIG. 1 during each horizontal line scanning interval.

At the beginning of the trace portion of each horizontal (line) deflection cycle, the current in deflection winding 33 is at a maximum amplitude and is flowing in the direction from terminal H to terminal H'. Diode 29 in trace switching means 25 is forward biased at this time and acts to couple deflection winding 33 across capacitor 31 during the first half of trace. The deflection current declines substantially linearly and produces a gradual increase in the voltage across capacitor 31 (see FIG. 2, waveform B) during the first half of trace. Approximately midway through the trace portion of the cycle, the current through deflection winding 33 passes through zero, reverses and switches from diode 29 to SCR 27. SCR 27 is placed in standby condition in preparation for this switching of current paths by means of a gating signal provided by triggering circuit 49. When SCR 27 commences conduction, capacitor 31 remains coupled across winding 33. However, energy now is transferred from capacitor 31 to winding 33 via SCR 27 and the voltage across capacitor 31 declines gradually as the deflection current in winding 33 increases substantially linearly during the latter half of the trace interval.

During the time that trace switching means 25 is conductive as described above and commutating switching means 39 is open (i.e. non-conductive), capacitors 35 and 45 are coupled in parallel across a current supply comprising the series combination of inductors 37 and 47 coupled to the main voltage supply (B+) of the receiver. Inductor 47, which stores energy during the commutating portion of each deflection cycle (see below), transfers a portion of its stored energy to capacitors 35 and 45 while they are coupled in parallel. The voltage across the parallel combination of capacitors 35 and 45 typically increases during this interval (see solid line ramp portion of waveform A—the voltage across switch 39). A portion of the energy so stored in capacitors 35 and 45 is transferred during the retrace portion of each deflection cycle to deflection winding 33 and to the voltage generating circuits associated with transformer 53 including high voltage rectifier 57.

In order to initiate the retrace portion of each deflection cycle and to transfer energy from capacitors 35 and 45, several microseconds before the desired end of trace, a pulse is produced by horizontal oscillator 21. This pulse is shaped by triggering means 51 and the resultant waveform is applied to the gate electrode of commutating SCR 41. SCR 41 commences conduction and thereby completes a first closed circuit path comprising trace switching means 25, capacitor 35, inductor 37 and commutating switching means 39 and a second closed circuit path comprising commutating switching means 39, inductor 37 and capacitor 45. The current in deflection winding 33 temporarily continues to increase since trace switch 25 remains closed. The energy stored in capacitors 35 and 45 is circulated in the first and second paths in a resonant manner. At the same time, inductor 47 is coupled (by commutating switch 39) directly across the B+ supply producing an approximately linearily increasing current and substantial energy storage in inductor 47.

The current component associated with capacitor 35 serves to turn off SCR 27 (ie. that component flows through SCR 27 in the reverse direction) and, after a further short interval of conduction by trace diode 29, the retrace portion of the deflection cycle is initiated.

During the retrace interval, a complex sequence of energy exchange takes place among deflection winding 33, inductance 37, capacitors 35 and 45 and the high voltage supply circit including transformer 53, rectifier 57 and the load at the kinescope high voltage electrode 17. Stated briefly, the current in deflection windings 33 is reversed as a result of a resonant half-cycle energy exchange between windings 33 and the combination of inductor 37, capacitors 35 and 45 and the equivalent tuned circuit of transformer 53. A high voltage flyback pulse waveform is produced during retrace at the high voltage tap 53*c* and is rectified by rectifier 57 to produce a direct operating voltage of the order of 25,000 volts at electrode 17 of kinescope 13. The magnitude of the high voltage pulse is related directly to the peak magnitude of the deflection current in deflection winding 33 and to the magnitude of the voltage (stored energy) associated with capacitors 35 and 45 at the beginning of the retrace portion of the deflection cycle. The peak magnitude of the deflection current also is dependent upon the voltage (stored energy) associated with capacitors 35 and 45. The values of capacitors 35 and 45 and inductor 37 may be selected such that, without additional high voltage regulating means, for a given percentage change in high voltage, a predetermined percentage change will occur in peak deflection current. For example, for a ten percent change in high voltage, components 35, 45 and 37 may be selected to produce a change in peak deflection current in the range of 0–10%. For a particular set of selected values for capacitors 35 and 45, the ratio of the percentage change in deflection current to the percentage change in high voltage increases for a decrease in the value of inductance 37.

In the particular illustrated embodiment of the present invention, the component values are selected to produce, absent additional regulating means, a percentage change in peak deflection current at least one-half but preferably equal to a corresponding percentage change in high voltage.

Additional regulating means are coupled to inductor 47 for varying the input power supplied to deflection circuit 23 as high voltage and peak deflection current vary. The regulating means are arranged to maintain image width substantially constant over the expected operating range of supply voltage (B+) and beam current variations. Furthermore, the regulating means are arranged to maintain high voltage substantially constant for a variation in supply voltage of the order of twenty percent.

In the regular circuit, means are provided for sensing variations in high voltage produced at ultor electrode 17. Since it is desirable to provide such sensing in a relatively low voltage circuit and furthermore, since, as noted above, deflection trace current changes and high voltage changes are related in a substantially fixed manner by circuit constraints, the means for sensing variations in high voltage are coupled across capacitor 31. The voltage across capacitor 31 reflects changes in deflection current and therefore reflects changes in high voltage.

In operation, the peak value of the voltage produced across capacitor 31 (waveform B) at approximately the midpoint of the trace portion of each deflection cycle is directly related to the peak deflection current produced in deflection windings 33. A portion of the voltage produced across capacitor 31 is selected by means of variable resistance 67 and is compared to a fixed voltage reference provided by the combination of Zener diode 71 and the base-emitter junction of transistor 73. The difference between the selected portion of the voltage across capacitor 31 and the fixed reference voltage is coupled to transistor 73 so as to produce, typically, a unidirectional current pulse (see waveform C) in the output circuit of transistor 73 in the vicinity of the midpoint of the trace portion of the deflection cycle. The current supplied by transistor 74 flows through control winding 75*a* of saturable reactor 75 so as to produce magnetic flux therein which also links with windings 75*b* and 75*c*. Unidirectional current is sustained in control windings 75*a*, after transistor 73 ceases conduction, by means of the unidirectional current path provided by diode 77.

Current also flows in the load windings 75*b*, 75*c* (see waveform D) during each deflection cycle. The effective inductance of windings 75*b* and 75*c*, which is coupled in parallel with supply inductance 47, is inversely related to the current flowing in control winding 75*a* according to the characteristics of saturable reactor 75. An increase in current in control winding 75*a* has the effect of reducing the inductance of the parallel combination of inductor 47 and windings 75*b* and 75*c* and the converse also is true.

In the illustrated circuit configuration, an increase in main supply voltage (B+) tends to produce equal percentage increases in high voltage at ultor electrode 17 and peak deflection current supplied to deflection winding 33. However, an increase in deflection current produces an increase in the peak voltage across capacitor 31 which, in turn, causes an increase in the current supplied to control winding 75*a* by transistor 73. The effective inductance of the parallel combination of inductor 47 and windings 75*b* and 75*c* therefore decreases such that the voltage across capacitors 35 and 45 increases during the initial half of the trace interval but during the last half of trace, that voltage decreases as energy is returned via inductor 47 to the B+ supply (see dotted line portion of waveform A for voltage across capacitors 35 and 45). As a result, the energy available for transfer to the high voltage circuit and to deflection windings 33 is maintained substantially constant, thereby maintaining deflection current, high voltage and image width substantially constant despite changes in the B+ supply voltage.

When the B+ supply voltage decreases, the effective supply inductance (47, 75*b*, 75*c*) is increased to maintain the desired constant image width. The solid line portion of waveform A represents the maximum inductance condition. Saturable reactor 75 is arranged to reduce this maximum inductance sufficiently so that, for high supply voltage conditions, the effective supply inductance and the parallel combination of capacitors 35 and 45 have a natural resonant frequency sufficiently high that energy is returned to the B+ supply near the end of trace (i.e. the voltage across capacitors 35 and 45 peaks before the end of trace and then declines.

If beam current changes in kinescope 13, the circuit operates at follows. Assume beam current increases. The high voltage produced at ultor electrode 17 tends to decrease and the current in deflection winding 33 also tends to decrease. The ratio between the percentage change in deflection current and the percentage change in high voltage is determined by the circuit reactive impedances as stated above. With a selected ratio of unity, absent the components 65–81, image width would tend to decrease. However, the decrease in deflection current is sensed at transistor 73 and the inductance of saturable reactor 75 is increased so as to increase the energy (voltage) supplied to capacitors 35 and 45 to restore deflection current and high voltage to their nominal values.

A ratio of less than unity also may be utilized which will result in relatively constant image width over a selected range of beam current variations and substantially constant high voltage, deflection current and image width over a wide range of main B+ supply voltage variations.

While the invention has been described in terms of a preferred embodiment thereof, various modifications may be made within the scope of the broad aspects of the invention. For example, Zener diode 71 may be coupled between the emitter electrode of transistor 73 and ground or Zener diode 71 may be eliminated and an adjustment may be made in the relative values of resistors 65, 67, and 69. Transistor 73 may be eliminated in a particular application. Furthermore, an input signal responsive to variations in high voltage and/or deflection current may be derived from circuit components other than capacitor 31. For example, the capacitor in protection circuit 55 which is coupled to transformer primary winding 53*a* may be so used. The supply voltage $(+V_a)$ required for transistor 73 also may be derived, after suitable filtering, from the capacitor in protection circuit 55.

For particular applications, it is also possible to utilize load windings 75*b* and 75*c* directly as the supply inductor and thereby eliminate the separate inductor 47. While the resistor 67 is variable to permit adjustment of the high voltage produced at ultor electrode 17, it may also be desirable, in a particular application, to eliminate such an adjustment by, for example, making resistor 67 a fixed resistor.

One particular configuration corresponding to that illustrated in FIG. 1 is set forth below in terms of component values.

SCR 27—RCA type 37699
Diode 29—Type IN4826
Capacitor 31—1.5 microfarads
Deflection winding 33—450 microhenries
Capacitor 35—.068 microfarad
Inductor 37—55 microhenries
SCR 41—RCA type 37700
Diode 43—Type IN4826
Capacitor 45—.047 microfarad
Inductor 47—15 millihenries
Transformer 53—
  1.2 millihenries (primary)
  120 microhenries (leakage)
  .022 microfarad (distributed C)
Rectifier 57—Type 3CZ3
Resistor 65—4700 ohms
Resistor 67— 180 ohms (variable)
Resistor 69—510 ohms
Zener diode 71—6.8 volts Zener
Transistor 73—Type 2N3440
Reactor 75—(load windings 75*b*, 75*c*)—3 to 8 millihenries (variable)
Diode 77—Type FD 222
Diode 79—Type 2A200
Resistor 81—1,000 ohms
B+—+140 volts
$+V_a$—+60 volts

What is claimed is:

1. In a television receiver having an image display device and a deflection and high voltage generating circuit for supplying high voltage to said display device and for supplying deflection current, a regulator circuit comprising:
- supply means comprising a voltage source serially direct current coupled to a variable reactance for supplying current to capacitive energy storage means during a trace portion of each deflection cycle,
- means for coupling said capacitive energy storage means to said deflection and high voltage generating circuit during at least a retrace portion of each deflection cycle to provide operating current thereto, and
- means coupled to said deflection and high voltage generating circuit and to said variable reactance responsive to variations in said high voltage for varying said reactance to control the current supplied to said capacitive energy storage means and thereby to control the operating current supplied to said deflection and high voltage generating circuit to maintain image size substantially constant.

2. A regulator circuit according to claim 1 and further comprising:
- means for supplying a relatively low voltage representative of the magnitude of said high voltage, said relatively low voltage including a direct voltage component and a component which varies in response to changes in said high voltage,
- means coupled to said low voltage supplying means for selectively coupling the varying component of said low voltage to said means responsive to variations in said high voltage for varying said reactance in a compensating manner to maintain image size substantially constant.

3. The combination according to claim 2 wherein said means for supplying a relatively low voltage comprises variable means coupled to said means responsive to variations in high voltage for selectively setting said high voltage.

4. In a television receiver having an image display device and a deflection and high voltage generating circuit for supplying high voltage to said display device and for supplying deflection current, a regulator circuit comprising:
- supply means comprising a variable inductance coupled to a voltage supply for supplying operating current to said deflection and high voltage generating circuit,
- reactive circuit means including at least a first capacitor coupled to said inductance during the trace portion of each deflection cycle for storing energy and coupled to said high voltage circuit during the retrace portion of each deflection cycle, and
- means coupled to said deflection and high voltage generating circuit responsive to variations in said high voltage for varying said inductance so as to maintain image size substantially constant.

5. The combination according to claim 4 wherein
- said variable inductance comprises a saturable reactor having control windings coupled to said means responsive to variations in high voltage and variable inductance load windings operatively associated with said control windings and coupled to said first capacitor for varying the energy supplied thereto in response to variations in said high voltage.

6. The combination according to claim 5 and further comprising:
- a deflection winding and an energy supply capacitor coupled to said deflection winding during the trace portion of each deflection cycle,
- said means for supplying a relatively low voltage including said energy supply capacitor.

7. In a television receiver having an image display device, a deflection and high voltage generating circuit for supplying high voltage to said display device and for supplying deflection current having trace and retrace portions, said circuit comprising
- a deflection winding,
- energy storage means for supplying current to said winding,
- first switching means operable between conductive and non-conductive states for coupling said deflection winding to said energy storage means when in said conductive state,
- second switching means operable between conductive and non-conductive states,
- reactive circuit means comprising the series combination of a first capacitance and a first inductance coupled between said first and second switching means,
- high voltage generating means coupled to said deflection winding for supplying high voltage to said image display device,
- means for rendering said first and second switching means conductive periodically during each deflection cycle, a source of variable charging current coupled to said reactive circuit means, and means responsive to variations in said high voltage coupled to said charging current source for varying the current supplied thereby to maintain image size on said display device substantially constant.

8. A deflection and high voltage generating circuit according to claim 7 wherein said source of variable charging current comprises a variable inductance coupled to a source of voltage, said means responsive to variations in high voltage being coupled to said variable inductance.

9. A deflection and high voltage generating circuit according to claim 8 wherein said variable inductance comprises a saturable reactor having control windings coupled to said high voltage variation responsive means and variable inductance load windings operatively associated with said control windings coupled to said reactive circuit means.

10. A deflection and high voltage generating circuit according to claim 9 wherein said high voltage variation responsive means is coupled to said energy storage means, said reactive circuit means being arranged such that for varying current loads on said high voltage generating circuit, the ratio of the percentage change of deflection current to the percentage change of high voltage is greater than one-half but not greater than unity.

11. A deflection and high voltage generating circuit according to claim 10 wherein said means responsive to variations in high voltage comprises a voltage divider coupled to said energy storage means, and amplifying means coupled to said voltage divider and to said control windings.

12. A deflection and high voltage generating circuit according to claim 10 wherein said variable inductance further comprises a substantially fixed value inductor, a first diode coupling said load windings across said fixed inductor and a second diode coupled across said control windings.

References Cited

UNITED STATES PATENTS

| | | | |
|---|---|---|---|
| 2,856,560 | 10/1958 | Sanford | 315—27 |
| 3,061,757 | 10/1962 | Janssen et al. | 315—27 |
| 3,320,470 | 5/1967 | Janssen et al. | 315—27 |
| 3,377,501 | 4/1968 | Janssen et al. | 315—27 |
| 3,359,453 | 12/1967 | Slavik | 315—27 |

RICHARD A. FARLEY, Primary Examiner

J. G. BAXTER, Assistant Examiner